United States Patent
Hong et al.

(10) Patent No.: US 6,599,608 B2
(45) Date of Patent: Jul. 29, 2003

(54) MEDIA EMPLOYING SUBSTANTIALLY SPHERICAL MAGNETO-PLUMBITE FERRITE PARTICLES

(75) Inventors: Yang-Ki Hong, Moscow, ID (US); Hong Sik Jung, Moscow, ID (US); Patrick R. Taylor, Moscow, ID (US)

(73) Assignee: Idaho Research Foundation, Inc., Moscow, ID (US)

( * ) Notice: Subject to any disclaimer, the term of this patent is extended or adjusted under 35 U.S.C. 154(b) by 0 days.

(21) Appl. No.: 10/191,787

(22) Filed: Jul. 8, 2002

(65) Prior Publication Data

US 2003/0077382 A1 Apr. 24, 2003

Related U.S. Application Data

(63) Continuation of application No. 09/760,259, filed on Jan. 12, 2001, now abandoned, which is a continuation of application No. 09/187,280, filed on Nov. 6, 1998, now Pat. No. 6,251,474.

(51) Int. Cl.⁷ ................................................ B32B 3/02
(52) U.S. Cl. ................ 428/65.3; 252/62.54; 252/62.63; 427/128; 427/130; 427/132; 427/215; 427/217; 427/383.3; 428/329; 428/336; 428/694 GT; 428/694 XS; 428/694 BA; 428/697; 428/702; 428/900
(58) Field of Search ............................ 252/62.63, 62.54; 427/128–132, 215, 217, 383.3; 428/329, 336, 694 GT, 694 XS, 694 BA, 697, 702, 900, 65.3

(56) References Cited

U.S. PATENT DOCUMENTS

| | | |
|---|---|---|
| 4,372,865 A | 2/1983 | Yu et al. |
| 4,764,300 A | 8/1988 | Hibst et al. |
| 4,806,728 A | 2/1989 | Salzer et al. |
| 4,992,191 A | 2/1991 | Mori et al. |
| 5,336,421 A | 8/1994 | Kurita et al. |
| 5,356,712 A | 10/1994 | Hashiuchi et al. |
| 5,605,753 A | 2/1997 | Sanada et al. |
| 5,731,085 A | 3/1998 | Hakata et al. |

FOREIGN PATENT DOCUMENTS

JP        02066902 A        3/1990

OTHER PUBLICATIONS

Hong et al., *Particle Stacking Dependence of Properties and Dispersibility of Ba–Ferrite Powder for Magnetic Recording*, J. Korean Magnetics Society 6:117 (Apr. 1996) (English Abstract).

Hong et al., *A Study on Difference in Coercivity between Ba–Ferrite Powder and Tape*, J. Korean Magnetics Society 6:251 (Aug. 1996) (English Abstract).

(List continued on next page.)

*Primary Examiner*—Bernard Pianalto
(74) *Attorney, Agent, or Firm*—Klarquist Sparkman, LLP

(57) ABSTRACT

Substantially spherical magneto-plumbite ferrite (barium or strontium ferrite) particles are formed from well-dispersed ultra-fine substantially spherical iron-based oxide and/or hydroxide particles as precursor particles. The precursor particles are mixed with a colloidal barium or strontium carbonate ($BaCO_3$ or $SrCO_3$), and with small amounts of a byproduct, such as sodium or potassium chloride (NaCl or KCl) or hydroxide (NaOH or KOH) or nitrate ($NaNO_3$ or $KNO_3$), functioning as a flux to lower the calcination temperature. The particles are filtered out of the mixture, dried, and calcined for a time sufficiently long and/or at a temperature sufficiently high to form magneto-plumbite ferrite from the precursor particles, and for a time sufficiently short and/or a temperature sufficiently low to maintain the general spherical shape of the precursor particles. The particles are used for forming a magnetic recording media by dispersing the particles in a magnetic paint and coating the paint onto a substrate, or by dispersing the particles in a self-supporting material.

1 Claim, 9 Drawing Sheets

OTHER PUBLICATIONS

*Kodak Exploring New Multifunction Magnetic Card Technology*, Press Release, May 14, 1996.

Hosaka et al., *Digital Recording Properties of High Coercivity Magnetic Credit Card*, Proceedings of the International Conference, pp. 575–578 (Sep.–Oct. 1980).

Chagnon et al., *Controlled Coercivity in Barium Ferrite Rigid Disk Coatings*, J. Appl. Phys. 67:5170–5172 (May 1, 1990).

Sharrock et al., *The Application of Barium Ferrite Particles in Advanced Recording Media*, IEEE Trans. Mag. 31:2871–2876 (Nov. 1995).

Kodama et al., *Media Noise and Interparticle Interactions of Barium Ferrite Particulate Rigid Disks*, J. Magnetism and Magnetic Materials 116:291–297 (1992) (No month avail.).

Smith et al., *High Density Storage on a Magnetic Stripe Card*, IEEE Trans. 32:4025–4027 (Sep. 1996).

Jung et al., *Epitaxial Growth of NiZn Ferrite on Barium Ferrite Particles*, IEEE Trans. Mag. 34:1675–1677 (Jul. 1998).

Fujita et al., *Magnetic Properties of Acicular $BaFe_{12}O_{19}$ Particles Prepared by Microwave Plasma Sintering*, IEEE Trans. Mag. 29:2129–2133 (Jul. 1993).

Sugimoto et al., *Formation of Uniform Spherical Magnetite Particles by Crystallization from Ferrous Hydroxide Gels*[1], J. of Colloid and Interface Science 74:227–243 (Mar. 1980).

Matijević et al., *Ferric Hydrous Oxide Sols, III. Preparation of Uniform Particles by Hydrolysis of Fe(III)–Chloride, –Nitrate, and –Perchlorate Solutions*, J. Colloid and Interface Science 63:509–525 (Mar. 1, 1978).

Adschiri et al., *Rapid and Continuous Hydrothermal Crystallization of Metal Oxide Particles in Supercritical Water*, J. American Ceramic Soc. 75:1019–1022 (1992) (No month avail.).

MEDIA EMPLOYING SUBSTANTIALLY SPHERICAL MAGNETO-PLUMBITE FERRITE PARTICLES

CROSS REFERENCE TO RELATED APPLICATIONS

This application is a continuation of application Ser. No. 09/760,259, filed Jan. 12, 2001, abandoned which is a continuation of application Ser. No. 09/187,280, filed Nov. 6, 1998, U.S. Pat. No. 6,251,474.

FIELD OF THE INVENTION

This invention relates to substantially spherical magneto-plumbite ferrite (barium or strontium ferrite) particles and methods for their production, and to magnetic recording media formed therewith.

BACKGROUND OF THE INVENTION

Magnetic recording media are employed in a wide variety of applications, including identity cards, credit cards, banking cards, parking permits, hotel key cards, tollgate cards, data tapes, and floppy disks. In these and similar applications, it is desirable to provide a recording medium that both minimizes unintended erasure and maximizes storage capacity (bit density).

A magnetic recording media requires adequately high coercivity (a measure of magnetic field strength of a magnetized substance and of its resistance to demagnetization) to minimize accidental loss of stored data. In magnetic stripe cards, for example, accidental erasures associated with low coercivity of the recording medium account for 60% of card failures.

A magnetic media also preferably has relatively low magnetic interaction (a measure of the degree of magnetic interaction of one point on the media with adjacent areas on the media). Lower magnetic interaction allows increased bit density, providing increased data storage capacity in the same space.

Increases in storage capacity could provide extended capabilities in devices employing magnetic media. In the case of magnetic stripe cards, because a standard banking credit card has only 140 bytes of storage, a typical consumer uses several separate magnetic stripe cards. Larger storage capacity would allow the combination of several cards into one multifunctional magnetic card. New functions not currently performed by magnetic cards could even be added to such a card.

Magneto-plumbite ferrite particles have been used in magnetic recording media. Magneto-plumbite ferrite particles have the advantage of relatively high coercivity (e.g., anywhere from 300 to more than 3500 Oe), and have shown a corresponding greater resistance to erasure than media using typical acicular (needle-like) metal particles.

But magneto-plumbite ferrite particles have the disadvantage of tending to group together in clumps or stacks during general production, processing, and handling of the particles. Additionally, in the production of a magnetic layer employing magneto-plumbite ferrite particles, the still-wet layer is subjected to a magnetic field to orient the particles. This magnetic orientation process significantly increases particle grouping of magneto-plumbite ferrite particles. Groups of particles tends to act magnetically as a single particle, resulting in uneven and larger-than-desired effective particle sizes and increased magnetic interaction. Such groups of particles produce uneven magnetic properties in a magnetic media, resulting in high media noise and correspondingly lower maximum bit densities. To increase the storage capacity of a magnetic media, the density of such defects must be decreased in order to maintain an adequate media signal-to-noise ratio.

Grouping of particles during particle preparation can result in a small amount of strongly bonded clumps or stacks (agglomerates) remaining in the prepared powder. Such agglomerates do not disperse during the milling process for preparation of a magnetic paint. After the milling process, these non-dispersed particles clog filter pores during the filtering process, decreasing filter efficiency. The non-dispersed particles can also contribute to defects such as pinhole, stain, and rough surface on the top surface of the magnetic layer. These defects cause various problems, such as media noise (including dropout and signal spike), collision between head and media, etc.

At CardTech/SecurTech in 1996, Eastman Kodak Company announced the Intelligent Magnetics card system, having comparable capabilities to a chip (or smart) card but at much less cost. The MR (magneto resistive) head used for high-density storage applications such as the Intelligent Magnetics card system is much more sensitive than inductive heads used in current card systems. Consequently, a magnetic card for such a system requires a small concentration of magnetic particles uniformly dispersed throughout the whole card. If there are clumps or stacks of non-dispersed magnetic particles in a card, a magnetic field higher than that of the surrounding magnetic particles will be generated, resulting in a signal spike. In a card designed for high storage capacity, uniformity of dispersion is critical to obtaining a stable signal from the card.

For all of the above reasons, it is desirable to minimize particle grouping and maximize the uniformity of dispersion of magneto-plumbite ferrite particles for use in magnetic recording media.

SUMMARY OF THE INVENTION

The present invention introduces substantially spherical magneto-plumbite ferrite particles, processes for the production of such particles, and magnetic media employing such particles. The particles of the present invention provide improved uniformity of dispersion and decreased magnetic interaction between particles in magnetic recording media compared to previous forms of magneto-plumbite ferrite particles. The process for the preparation of the substantially spherical magneto-plumbite ferrite particles results in a narrow particle size distribution, controllable coercivity ($H_c$), and excellent dispersion stability with reduced particle stacking or clumping in the organic solvents and binders used to produce magnetic recording media.

Particle clumping and stacking in media is influenced by several factors, including properties of the particles such as particle shape, diameter, and aspect ratio, and other factors such as viscosity and composition of the magnetic paint, the applied magnetic field used for particle orientation, and milling conditions during processing of the particles. However, it has been found that a principle cause of particle stacking in magneto-plumbite ferrite particles is the platelet shape of typical magneto-plumbite ferrite particles. Typical magneto-plumbite ferrite particles have a flat, hexagonal shape like a six-sided plate. The mean aspect ratio of such "platelet" magneto-plumbite ferrite particles, i.e., the mean ratio of the longest dimension (diameter) to the shortest dimension (thickness), is typically not less than about 3:1, and can be significantly higher. Particles having higher aspect ratios tend to stack or clump together more than those having lower aspect ratios.

Acicular (needle-like) magneto-plumbite ferrite particles have also been reported. Acicular particles, with aspect ratios often as great as 10:1 or more, are also difficult to disperse evenly.

The substantially spherical shape and the associated low aspect ratio (approaching 1:1) of the particles of the present invention significantly reduces the tendency of the particles to form stacks or clumps, as compared to previous magneto-plumbite ferrite particles. Preventing particles from clumping or stacking decreases the degree of magnetic interaction and improves dispersion stability in a magnetic paint or other magnetic medium. The even dispersion that is achieved with the use of the particles of the present invention allows the creation of higher-density magnetic media, allowing more information to be stored within the same amount of space. The increased storage capacity allows the creation of such devices as magnetic cards that function like smart cards, and higher capacity magnetic storage disks and tapes for digital data handling and storage.

The chemical formula of the particles of the present invention is as follows:

$$AO \cdot n(Fe_{2-x}M_xO_3) \qquad (1)$$

where A is Ba, Sr, or mixtures thereof, n is within the range of from about 5.0 to about 6.0, and M is more than one of the group of substitution elements Co, Zn, Ni, Mn, Al, Ti, Sn, Si, Nb, and Ta, and x is within the range of from about 0 to about 0.35. The particles are substantially spherical, having a mean aspect ratio generally less than about 2:1, desirably less than about 1.5:1, most desirably less than about 1.25:1.

The particles of the present invention are prepared by mixing ultra-fine (e.g., about 0.05 to about 1.2 μm diameter) substantially spherical iron-based oxide and/or hydroxide particles, such as magnetite ($Fe_3O_4$), maghemite ($\gamma$-$Fe_2O_3$), hematite ($\alpha$-$Fe_2O_3$), spinel ferrite ((Co, Ni, Zn, Mn, Ti, Si)$_x$$Fe_{3-x}O_4$), and/or iron hydroxide (FeOOH) with a source of Barium and/or Strontium, such as colloidal barium or strontium carbonate ($BaCO_3$ or $SrCO_3$), with small amounts of a byproduct, such as sodium or potassium chloride (NaCl or KCl), hydroxide (NaOH or KOH), or nitrate ($NaNO_3$ or $KNO_3$) functioning as a flux to lower the calcination temperature.

The solid phase of the dispersion is then filtered off, dried, and calcined at a temperature sufficiently high and for a time sufficiently long to produce the desired magneto-plumbite ferrite, yet sufficiently low and sufficiently short to allow the particles to substantially retain the shape of the iron-based oxide/hydroxide precursor particles. Temperatures generally not more than about 900° C. allow the particles to substantially retain the shape of the precursor particles, desirably in the range of about 730° C. to about 870° C. In the working examples described below, particles according to the present invention were produced at calcination temperatures in the range of about 780° C. to about 810° C., at times from about 1 to about 2 hours.

The substantially spherical magneto-plumbite ferrite particles of the present invention prepared as described herein have a coercivity in the range of from about 1000 Oe to about 5500 Oe, high saturation magnetization above about 35 emu/g, and narrow coercivity distribution (evidenced by a measured switching field distribution (SFD) of 0.40 for spherical barium ferrite particles compared to 0.60 for platelet barium ferrite particles in an otherwise identically-prepared magnetic medium), while maintaining excellent dispersibility and reducing or eliminating particle stacking. These properties are well suited to magnetic recording applications. Hand-coated magnetic tapes prepared with the particles of the present invention have shown good magnetic properties, as set forth in the examples below. Thus the substantially spherical magneto-plumbite ferrite particles of the present invention may suitably be used as the magnetic powder material of magnetic recording tape, and would also find application in such media as magnetic stripe cards, floppy disks, etc., particularly for high-capacity storage applications.

The process of the present invention economically allows the mass production on an industrial scale of the spherical magneto-plumbite ferrite particles having the desired properties mentioned above. Magnetic storage media may be prepared from the particles of the present invention by conventional means, such as mixing the particles in a magnetic paint, then coating the paint on a substrate such as a card, a tape, or a disk, or such as mixing the particles directly into a polymer or the like, then forming a card, a tape or a disk of the polymer.

Additional objects, features, and advantages of the invention will become more apparent from the following detailed description and accompanying drawings.

DETAILED DESCRIPTION

The present invention includes substantially spherical magneto-plumbite ferrite particles, magnetic media formed of such, and processes for producing such. The chemical formula of the particles is as given above by formula (1). The shape of the particles is substantially spherical, as opposed to the platelet and acicular magneto-plumbite ferrite particles previously known. The particles of the invention have a mean aspect ratio of less than about 2:1, desirably less than about 1.5:1, and more desirably less than about 1.25:1, as contrasted with aspect ratios of about 3:1 and greater for previously known magneto-plumbite ferrite particles.

In brief, the process for making substantially spherical magneto-plumbite ferrite particles comprises providing a well-dispersed ultra-fine (e.g., from about 0.05 to about 1.2 μm diameter) substantially spherical iron-based oxide and/or hydroxide particles, such as magnetite ($Fe_3O_4$), maghemite ($\gamma$-$Fe_2O_3$), hematite ($\alpha$-$Fe_2O_3$), spinel ferrite ((Co, Ni, Zn, Mn, Ti, Si)$_x$Fe$_{3-x}$O$_4$), iron hydroxide (FeOOH), materials that form such on heating, and mixtures thereof. The iron-based oxide and/or hydroxide particles (or sources thereof) are mixed with a colloidal source of barium and/or strontium such as barium or strontium carbonate (BaCO$_3$ or SrCO3) or mixtures thereof, with small amounts of a flux agent. The flux agent can be a byproduct, such as Group I metal salts including sodium or potassium chloride (NaCl or KCl), hydroxide (NaOH or KOH), or nitrate (NaNO$_3$ or KNO$_3$). The flux agent lowers the calcination temperature.

In the particular examples to be discussed below, a well-dispersed aqueous slurry of spherical iron-based oxide and/or hydroxide, such as magnetite (Fe$_3$O$_4$), maghemite ($\gamma$-Fe$_2$O$_3$), hematite ($\alpha$-Fe$_2$O$_3$), spinal ferrite ((Co, Ni, Zn, MN)$_x$Fe$_{3-x}$O$_4$), and iron hydroxide (FeOOH) was provided. This slurry was mixed with an aqueous source of metal A, such as a chloride or nitrate or hydroxide solution, an aqueous source of metal M such as a chloride and/or nitrate solution (with A and M as defined above in formula (1)), an aqueous sodium carbonate or potassium carbonate ((Na$_2$CO$_3$ or K$_2$CO$_3$) solution, and an aqueous sodium hydroxide or potassium hydroxide ((NaOH or KOH) solution. The resulting mixture was then filtered and dried, and the particles thus obtained were subjected to calcination at temperatures in the range from about 780° C. to about 81 0° C., which is within a desirable range of from about 730° C. to about 870° C., in any event desirably less than about 900° C. After calcination, the agglomerated particles were wet-milled, filtered, washed, and dried.

Figure 1:
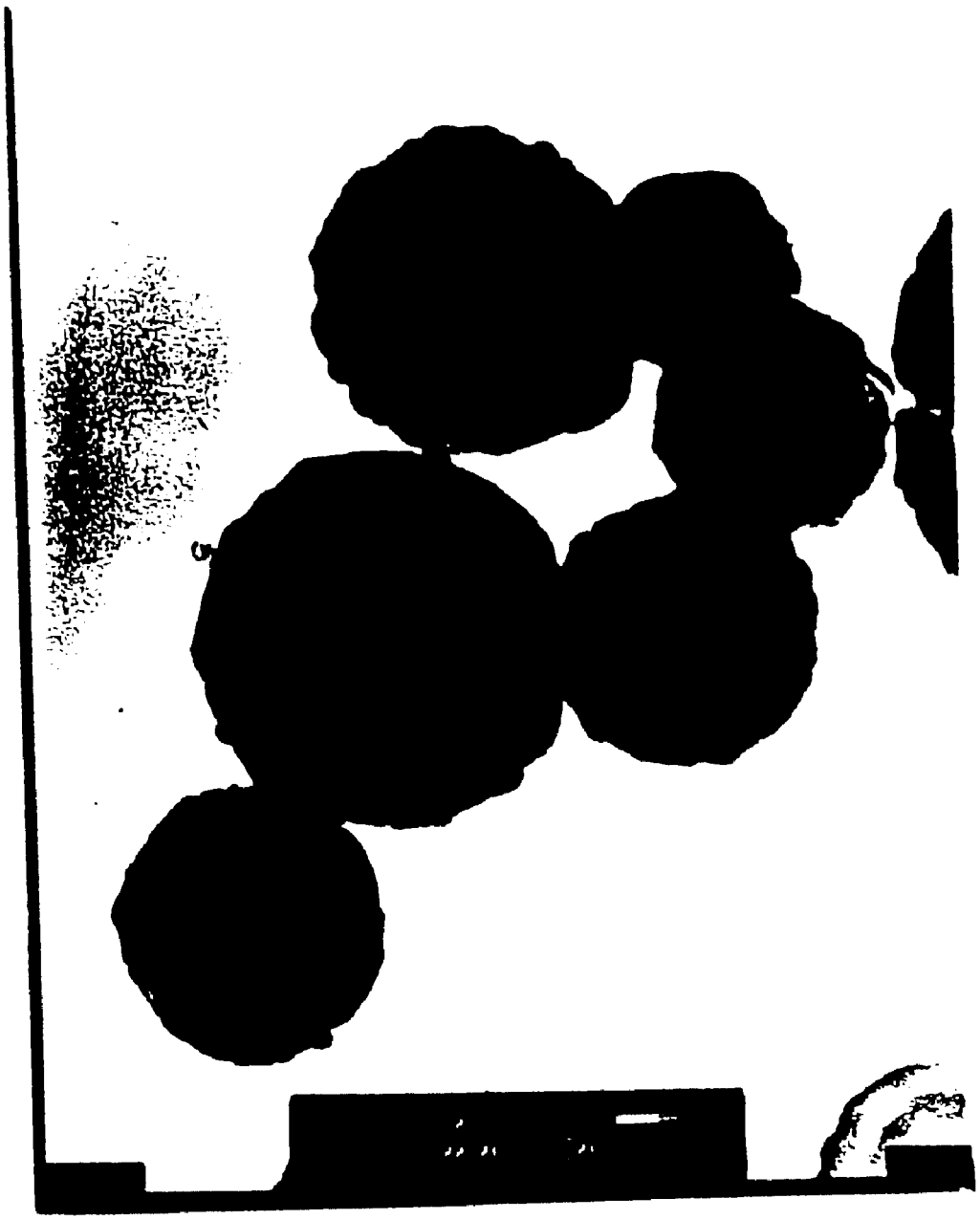
FIGS. 1, 2, 3 and 4 are TEM (transmission electron microscope) micrographs of substantially spherical magneto-plumbite ferrite particles of the present invention.
Figure 2:
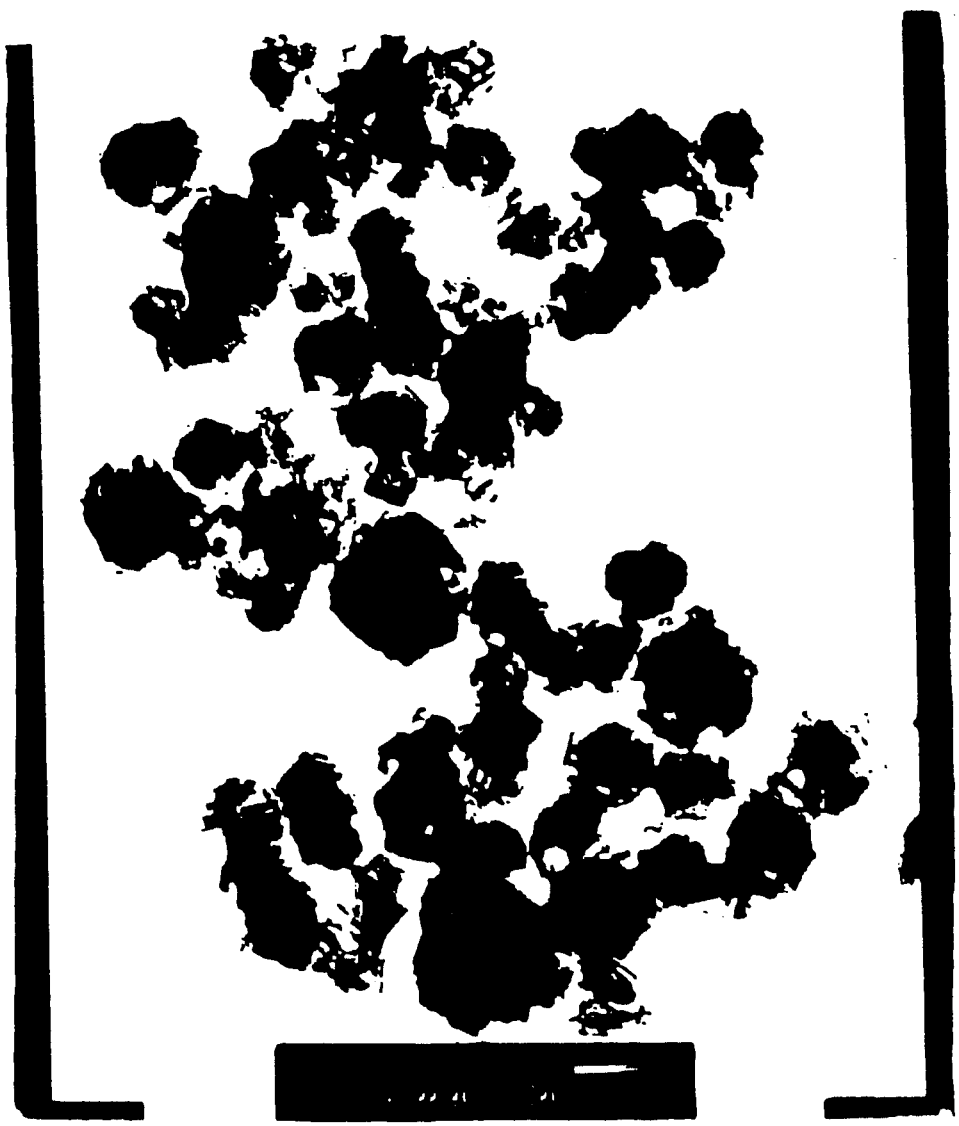
Figure 3:
Figure 4:
Figure 10:
FIG. 10 (PRIOR ART) is a TEM micrograph of prior-art platelet magneto-plumbite ferrite (barium ferrite) particles.

The spherical magneto-plumbite ferrite particles in the particular examples discussed below were characterized by a substantially spherical particle shape observed using a Transmission Electron Microscope (TEM). FIGS. 1 and 2 are TEM micrographs of such particles at 30,000 times magnification showing the substantially spherical shape of the particles. FIG. 3 is a micrograph of such particles at 60,000 times magnification, and FIG. 4 is a micrograph at 120,000 times magnification, both showing the substantially spherical shape. This may be contrasted with the shape of known (platelet) magneto-plumbite ferrite particles, as shown in FIG. 10 (prior art). FIG. 10 is a TEM micrograph such known particles at 25,000 times magnification. The particles in the micrograph of FIG. 10 are oriented with plate faces perpendicular to the plane of the micrograph, so the hexagonal shape is not evident, however, the relatively high mean aspect ratio of the particles may thus be observed.

Magnetic properties of both magnetic particles and magnetic tapes prepared therefrom were measured, using a Vibrating Sample Magnetometer (VSM). Dispersion of the magneto-plumbite particles in hand-coated magnetic tapes was also evaluated by measuring $\Delta M$ defined as follows:

$$\Delta M(H) = (M_D(H) - (1 - 2M_R(H))) \tag{2}$$

where $M_D$ is a normalized remanent magnetization from the dc demagnetization (DCD) curve, and MR is a normalized remanent magnetization from the isothermal remanent magnetization (IRM) curve. Particle stacking shows a high positive value of $\Delta M$, which indicates strong positive magnetic interaction resulting in high media noise. The value of positive $\Delta M$ may thus be used as an indication of particle stacking of magneto-plumbite ferrite particles.

Figure 5:
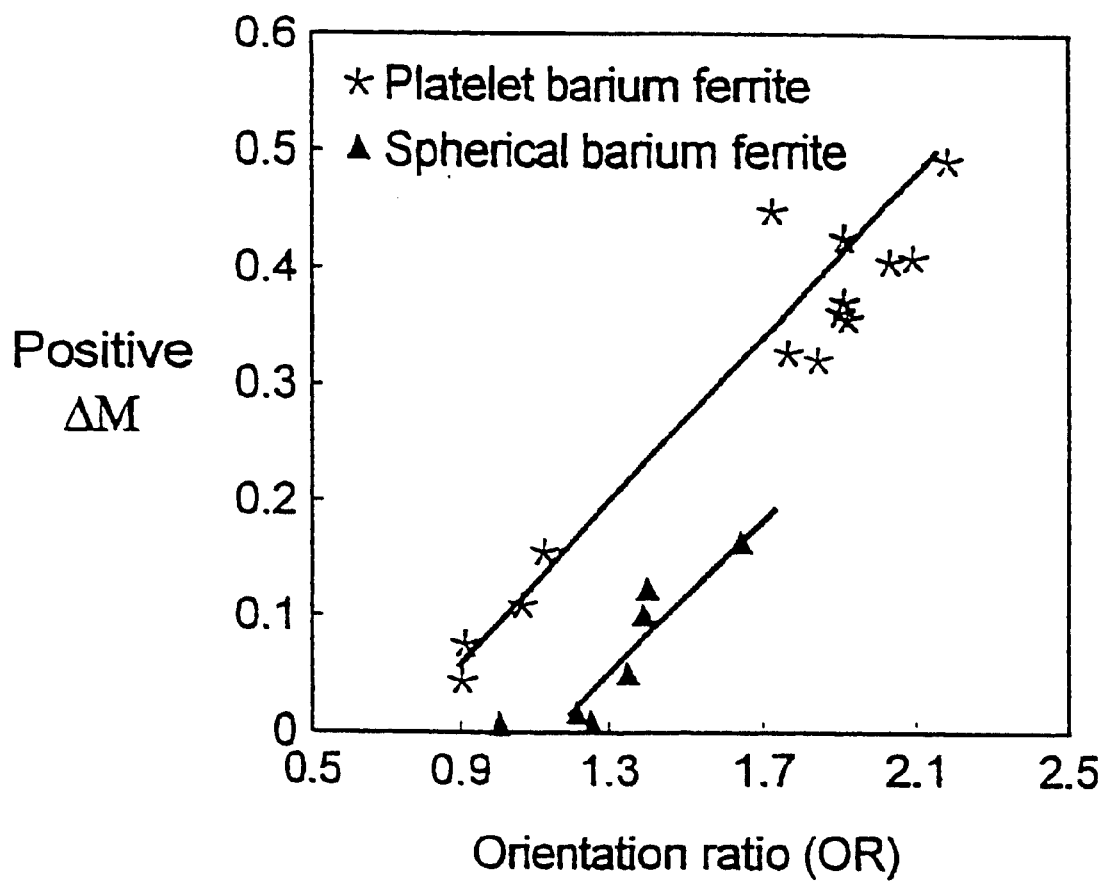
FIG. 5 is a graph of the measured value of positive ΔM as function of the measured orientation ratio (OR) in hand-coated magnetic tapes prepared from spherical barium ferrite powder and from platelet barium ferrite powder.

FIG. 5 is a graph of the measured value of positive $\Delta M$ as function of the measured orientation ratio (OR) in tapes prepared with spherical barium ferrite powder and with platelet barium ferrite powder. The platelet and spherical particle data are from tapes prepared as explained below. Three different platelet barium ferrite powders were used, having the following properties: (1) particle size of about 0.8 to about 1 $\mu$m, coercivity of about 2,880 Oe, and saturation magnetization of about 52.4 emu/g; (2) particle size of about 0.5–0.7 $\mu$m and coercivity of about 1400 Oe; and (3) particle size of about 0.06–0.08 $\mu$m and coercivity of about 980 Oe. As shown in FIG. 5, the value of $\Delta M$ for media prepared from spherical barium ferrite powder is characteristically smaller than that of media prepared from platelet barium ferrite powder, indicating the weaker strength of magnetic interaction between particles in the spherical barium ferrite powder than in the platelet barium ferrite powder. Since the strength of magnetic interaction depends on the degree of stacking of particles, the lower $\Delta M$ for media prepared from spherical barium ferrite powder confirms the expected reduction in stacking.

Controlling the substantially spherical shape of the magneto-plumbite ferrite particles is achieved in part by using a substantially spherical iron-based oxide or hydroxide, such as magnetite (Fe$_3$O$_4$), maghemite ($\gamma$-Fe$_2$O$_3$), hematite ($\alpha$-Fe$_2$O$_3$), spinel ferrite ((Co, Ni, Zn, Mn, Ti, Si)xFe$_{3-x}$O$_4$), iron hydroxide (FeOOH) or mixtures thereof as raw material. Because the ionic radius of barium and strontium is similar to that of oxygen, barium or strontium ions can diffuse into an iron-based oxide lattice if the ions have sufficient thermal energy.

Reaction proceeds from the surface to the center of the iron oxide after decomposition of barium and/or strontium sources, such as carbonate (BaCO$_3$ and/or SrCO$_3$). Spherical iron-based oxide particles can become magneto-plumbite ferrite during calcination, while still maintaining the spherical shape of iron-based oxide. The calcination temperature is selected to be sufficiently low to ensure the desired particle shape. Control of spherical particle shape in the magneto-plumbite ferrite is thus based on the use of both spherical iron-based oxide or hydroxide and sufficiently low calcination temperature.

In the preparation process, an aqueous barium and/or strontium solution from the corresponding metal halides, e.g., chlorides (BaCl$_2$·2H$_2$O or SrCl$_2$·6H$_2$O), nitrates (Ba(NO$_3$)$_2$, Sr(NO$_3$)$_2$ or Sr(NO$_3$)$_2$·4H$_2$O), or metal hydroxide (Ba(OH)$_2$·8H$_2$O or Sr(OH)$_2$·8H$_2$O), an aqueous M chlorides and/or nitrates, an aqueous sodium or potassium carbonate ((Na$_2$CO$_3$ or K$_2$CO$_3$) solution, and an aqueous sodium or potassium hydroxide (NaOH or KOH) solution is added to a well-dispersed spherical iron-based oxide slurry with vigorous stirring. The value for n (see formula (1) above) is in the range of about 5.0 to about 6.0, and x, the content of substitution elements, is in the range of about 0 to about 0.35.

The resulting mixture of spherical iron-based oxide or hydroxide, (Ba and/or Sr)CO$_3$, and by-product, NaCl or KCl, is stirred or at least 10 minutes, desirably 20 minutes, at room temperature. After mixing, the solids of the mixed slurry are filtered out (without washing) and dried at a temperature desirably below about 150° C.

The dried particles are then calcined for a time and at a temperature sufficient to form magneto-plumbite ferrite without significantly altering the substantially spherical particle shape. Such a temperature is desirably not greater than about 900° C., with calcination generally desirably performed in the range of about 730° C. to about 870° C. for about 0.5 hour to about 3 hours.

After calcination, the calcined particles are wet-milled to reduce and/or prevent strong-bonding agglomeration, filtered and washed using Buchner-type funnel. The particles are then dried and then comminuted, such as by using a pestle. The particles thus obtained are spherical magneto-plumbite ferrite, and have the formula given above as formula (1).

The spherical iron-based oxide or iron hydroxide such as magnetite ($Fe_3O_4$), maghemite ($\gamma$-$Fe_2O_3$), hematite ($\alpha$-$Fe_2O_3$), spinel ferrite ((Co, Ni, Zn, Mn, Ti, Si)$_x$$Fe_{3-x}O_4$), and iron hydroxide (FeOOH) used as raw material should be well-dispersed to obtain both a high degree of reaction homogeneity and stable reproducibility of magnetic properties. This may be achieved either by using a dispersion mill with strong shear stress, such as a bead mill, or by preparing a well-dispersed slurry directly. If the spherical iron-based oxide particles have poor dispersion, the resulting calcined magneto-plumbite ferrite particles typically have three phases such as hematite ($\alpha$-$Fe_2O_3$), barium iron oxide ($BaFeO_3$ and/or $BaFe_2O_4$), and magneto-plumbite ferrite ($AFe_{12}O_{19}$). Appearance of such additional phases are attributed to agglomerates of the spherical iron-based oxides which prevent Ba or Sr ions from diffusing into the iron-based oxide particles. As a result, some iron-based oxides have deficient content of Ba or Sr ions.

Spherical iron-based oxide or hydroxide particles in the range of 0.05 $\mu$m to 1.2 $\mu$m are particularly suitable for the present process. Methods for preparing such particles are well known. According to U.S. Pat. No. 5,356,712, incorporated herein by reference, the seed crystals formed by the initial oxidation reaction are indefinite in shape, but these seed crystals become spherical in neutral to weakly alkaline (pH 6-9) environments. Among many factors, control of pH in the reaction is the most important factor in obtaining substantially spherical shaped iron-based oxide particles. As examples, spherical iron-based oxides or hydroxide may be obtained by the procedures disclosed in U.S. Pat. No. 4,992,191 ($Fe_3O_4$); *J. Colloid and Interface Sci.* 74 227–243 (1980) ($Fe_3O_4$); U.S. Pat. No. 5,336,421 ($Zn_xFe_{3-x}O_4$); U.S. Pat. No. 4,372,865 (iron-based hydroxide with a composition of spinel ferrite); ,= *J. Colloid and Interface Sci.* 63 509–524 (1978) ($\alpha$-$Fe_2O_3$); J. Mater. Res. 8 2694–2701 (1993) ($Fe_3O_4$, and $\gamma$-$Fe_2O_3$, and $\alpha$-$Fe_2O_3$); and/or *J. Am. Ceram. Soc.* 75 1019–1022 (1992) ($Fe_3O_4$ and $\alpha$-$Fe_2O_3$). Each of the foregoing references is hereby incorporated herein by reference.

If the spherical iron-based oxide (or hydroxide) particles are over-milled, the spherical shape of the particles may be lost, with the particles taking on an irregular or platelet shape. The milling time to obtain well-dispersed spherical iron-based oxides can vary and therefore should be optimized for a particular application, depending such factors as the milling conditions including solid content, type and size of bead used, revolutions per minute (rpm) of the mill, etc.

Calcination conditions are optimized by considering both magnetic properties and dispersibility of the spherical magneto-plumbite ferrite particles. Good spherical shape, which provides good particle dispersion, requires a relatively lower calcination temperature. Optimal magnetic properties require a relatively higher calcination temperature to increase the crystallinity of the particles. Therefore, the particular calcination temperature is chosen on the bases of targeted properties of the particles. In order to decrease the calcination temperature to obtain good dispersibility while maintaining good crystallinity, flux agents and raw materials having smaller grain sizes are used. In order to substantially maintain the spherical particle shape of the precursor iron-based oxide or hydroxide particles, and thereby improve the dispersibility of magneto-plumbite ferrite particles, the calcination temperature should generally be below about 900° C. because platelet magneto-plumbite ferrite particles are typically more stable than spherical magneto-plumbite ferrite particles at a calcination temperatures above about 900° C.

The calcination temperature depends on a number of factors, including particle surface energy (particle size) as well as external thermal energy for the diffusion of Ba or Sr into the iron oxide particles. Using sub-micron particle size $BaCO_3$ and/or $SrCO_3$ particles and a small amount of flux agent in the form of a reaction by-product, such as KCl, NaCl, or the like, decreases the decomposition temperature of $BaCO_3$ and/or $SrCO_3$. This is attributed both to the enhancement of decomposition of $BaCO_3$ and/or $SrCO_3$ by the flux agent and to the high surface energy associated with smaller particle size. In addition, the calcination temperature can be decreased by using sub-micron-sized spherical iron-based oxide or hydroxide particles. Calcination temperatures and times are desirably within the ranges of from about 730° C. to about 870° C. and of from about 0.5 hour to about 3 hours respectively, and most desirably within the ranges of from about 780° C. to about 810° C. and of from about 0.5 hour to about 2 hours. At calcination temperatures below about 870° C., the size and shape of spherical magneto-plumbite ferrite particles is generally dependent only on that of the precursor spherical iron-based oxide (or hydroxide) particles.

The effect of the molar ($Fe_{2-x}M_xO_3$)/AO ratio (n) on the magnetic properties in the spherical magneto-plumbite ferrite is significant. At below about n=5.0 in barium ferrite, (1) saturation magnetization is decreased due to the formation of barium iron compounds such as $BaFe_2O_4$ and $BaFeO_3$, and (2) coercivity distribution is very broad, which indicates the presence of high and low coercivity phases. At above about n=6.0, saturation magnetization decreases to below 35 emu/g due to the formation of the hematite phase. Therefore, the value of n (the molar ratio of ($Fe_{2-x}M_xO_3$)/AO) should be chosen in the range of from about 5.0 to about 6.0, and desirably in the range of about 5.3 to about 5.8.

In order to prevent decomposition of the ultra-fine $BaCO_3$ and/or $SrCO_3$, the pH of the dispersion should be adjusted to at least about 10 or above, preferably from about 11 to 12. To maintain the reproducibility of desired magnetic properties, it is important to retain a given content of barium and/or strontium during the mixing process. If the pH of the slurry is below about 9, especially in the acid range, ultra-fine $BaCo_3$ and $SrCO_3$ can decompose, resulting in the aqueous dissolution of Ba or Sr. Such dissolution produces Ba or Sr deficiency in the oxide particles, which results in the formation of a hematite ($\alpha$-$Fe_2O_3$) phase. The molar (Na or K)$_2CO_3$/A ratio is thus desirably more than 1, and the molar (NA or K)OH/A ratio is desirably more than 2, so as to maintain the pH above 11.

In addition to the calcination temperature, the relative amount(s) of the various substitution elements, selected from Co, Zn, Ni, Al, Ti, Sn, Si, Nb, Ta, and mixtures thereof, also substantially influence coercivity, coercivity distribution, and saturation magnetization of the spherical magneto-plumbite ferrite particles. There are five distinct crystallographic sites of sub-lattices, namely $4f_{VI}$, 2b, 12k, $4f_{IV}$, and 2a sites, for the metallic cations in magneto-plumbite ferrite. Iron ions at these various sites make different contributions to the magnetic properties of the magneto-plumbite ferrite. For example, the source of the uniaxial magneto-crystalline anisotropy of magneto-plumbite ferrite is largely the single-ion anisotropy of the iron ions at the 2b site.

Each substitution element has a particular lattice occupation preference and a corresponding different contribution to magnetic properties. For examples, Co ions have a large magneto-crystalline anisotropy in the in-plane direction and prefer to occupy the 2b sites with high magneto-crystalline anisotropy in the c-axis direction of magneto-plumbite ferrite. The substitution of Co ions at the 2b sites decreases coercivity, but increases saturation magnetization by the formation of excess spinel-block in the magneto-plumbite structure. Non-magnetic Zn ions prefer to occupy the $4f_{IV}$ sites having a spin-down magnetic moment, which substitution results in an increase in saturation magnetization. Zn ion substitutions at iron sites are less effective in decreasing coercivity than substitutions of Co ions, but coercivity distribution becomes narrower. Non-magnetic Ti ions prefer to occupy the 12k sites having a spin-up magnetic moment, which substitution stabilizes the magneto-plumbite structure. Temperature dependence of magneto-crystalline anisotropy of iron ions in 12k sites is larger compared to that in the other sites, so that the temperature coefficient of coercivity ($\Delta H_c/\Delta T$) of Co—Ti substituted magneto-plumbite ferrite reaches about +4 Oe/° C., but that in Zn—Ti substituted magneto-plumbite ferrite is below +1.0 Oe/° C. Consequently, the substitution of Co and Ti ions significantly decreases coercivity without a decrease in saturation magnetization, while maintaining narrow coercivity distribution. However, the temperature coefficient of coercivity ($\Delta H_c/\Delta T$) in Co—Ti-substituted magneto-plumbite ferrite is too large for use in practical applications. Therefore, combinations of substitution elements can be used to obtain desired or required magnetic properties. A desired combination of substitution elements comprises a combination of major substitutions of Zn—Ti with minor substitutions of Co, Sn, and Nb or Ta.

In order to evaluate magnetic interaction among spherical magneto-plumbite ferrite particles in magnetic tape, hand-coated tapes were made of magnetic paint milled for various milling times. The paint contained 30% non-volatile materials, including spherical barium ferrite powder, an organic solvent, and a binder. Various such solvents and binder are known in the art and may be used. For the specific examples described below, cyclohexanone was used as the solvent. The binder was a vinyl chloride-copolymer binder having a functional group of $SO_3^{-2}$, specifically MR 110 (obtained from Zeon Corporation, Tokyo, Japan) (20% solution).

To make the paint, 20 g of spherical barium ferrite powder are added to a solution composed of 20 g MRI 10 (20%) solution and 40 g of cyclohexanone circulated at 2500 rpm in an Eiger mill. Hand-coated tapes were prepared by known methods, using a permanent magnet with strength of NN 3500 Gauss for particle orientation. The tapes were dried at 120° C. Tapes using platelet barium ferrite particles were prepared for comparison by the same process.

Figure 6:
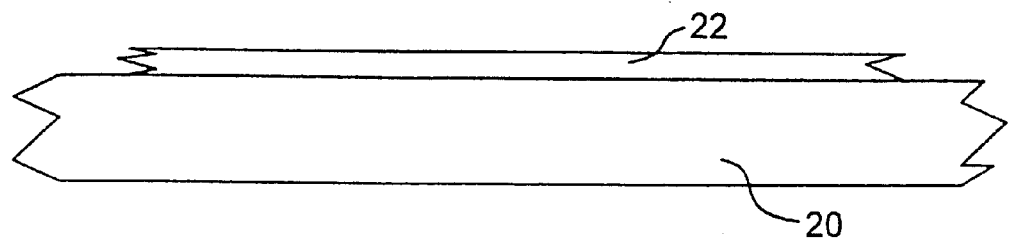
FIG. 6 is a side view of a magnetic recording tape made in accordance with the present invention.
Figure 7:
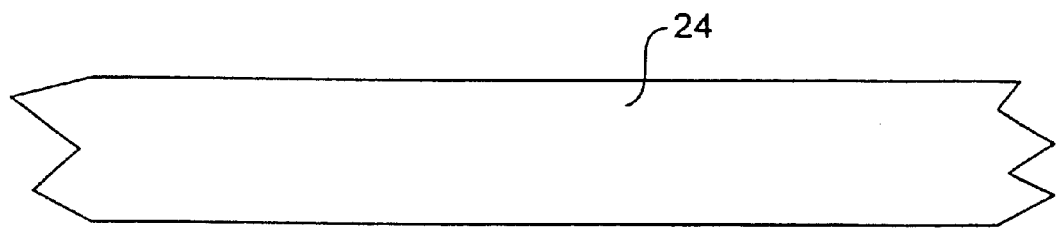
FIG. 7 is a side view of a magnetic recording medium having magnetic particles dispersed throughout the medium made in accordance with the present invention.

FIG. 6 shows a side view of a magnetic recording tape such as those prepared in the examples below. A substrate 20, typically non-magnetic, supports a magnetic layer 22 that formed by coating a magnetic paint onto the substrate 20. Suitable substrates are well known in the art and include various polymers such as PET (polyethylene terephthalate) and other film-forming materials. The present invention is also applicable to magnetic media such as shown in FIG. 7, wherein magnetic particles are dispersed within a self-supporting body 24, such as a magnetic card. The self-supporting body 24 may be formed of any suitable material, such as a polymer, in which the magnetic particles are dispersed. As examples, PVC (polyvinyl chloride) is currently used for credit cards, while PETG (a recyclable co-polyester) has been suggested as a more environmentally acceptable substitute.

Magnetic properties of hand-coated tapes prepared according to the invention were measured with a vibrating sample magnetometer (VSM) from Digital Measurement Systems Division of ADE Technologies, Burlington Mass., USA.

Specific examples of the process of the invention and the resulting inventive particles are given below. These examples describe particular features of working embodiments and should not be construed to limit the invention to the particular features described.

EXAMPLE 1

A dispersion comprising (1) 30 g of 0.8 μm spherical $Fe_3O_4$ and (2) 150 ml of a solution of 8.34 g of $BaCl_2 \cdot 2H_2O$, 1.47 g of $ZnCl_2$, and 2.04 g of $TiCl_4$ was prepared using an Eiger mill, which is a type of bead mill. A solution of 4.11 g of NaOH and 5.43 g of $Na_2CO_3$ in 60 ml of water was then added to the vigorously stirred solution. The slurry thus obtained was kept at room temperature for 20 minutes, while stirring.

After mixing, the solid phase of the slurry was filtered off using a Buchner-type funnel with a vacuum pump, and dried in a fume hood for 12 hours. The resulting dry material was dry-milled by mortar and pestle. The resulting comminuted powder was then calcined at 810° C. for 2 hours. The calcined powder was then wet-milled using an Eiger mill, washed to remove sodium and chloride ions, and dried at 130° C. for 6 hours.

Figure 8:
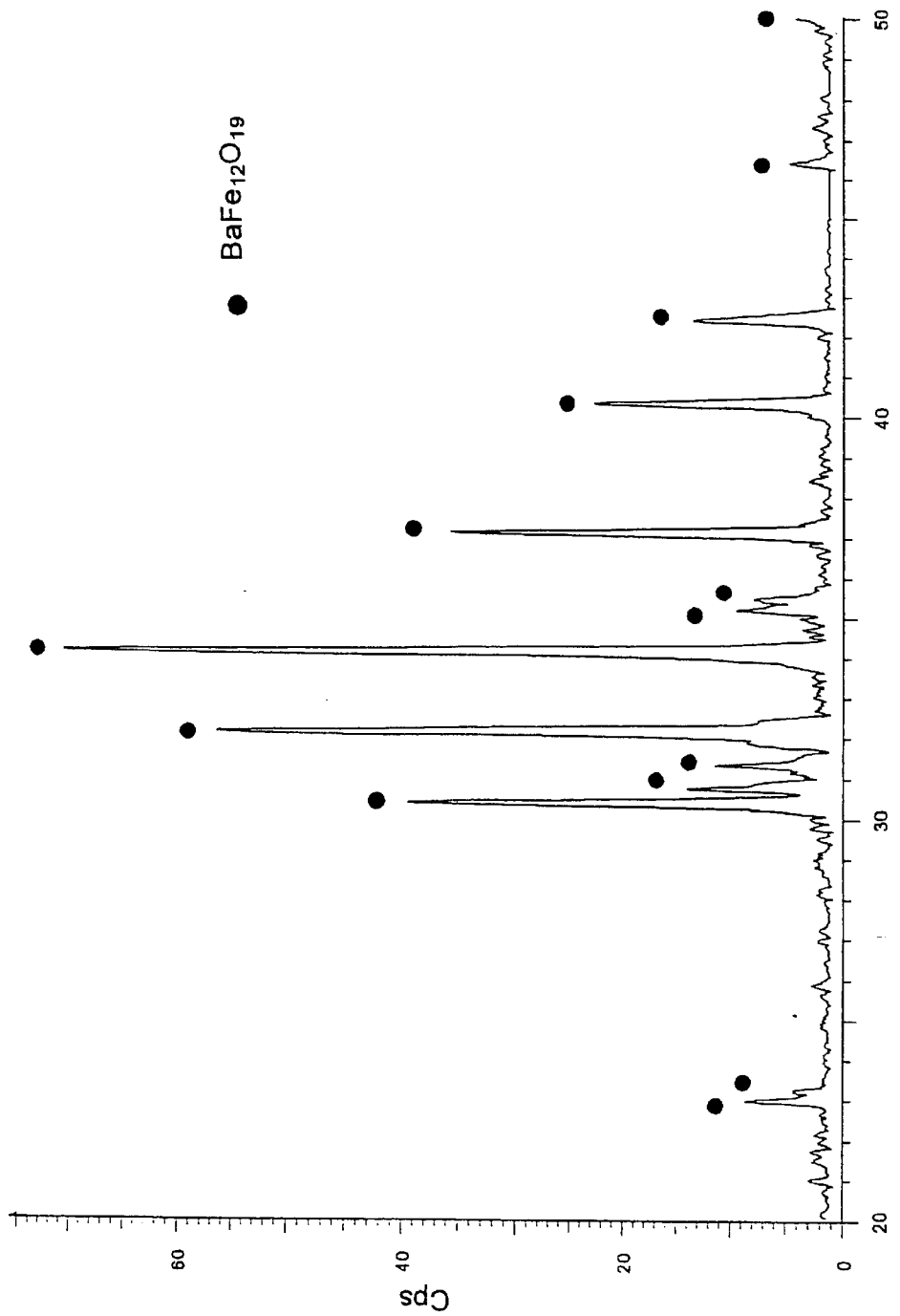
FIGS. 8 and 9 are computer-generated plots of the results of X-ray diffraction characterization of particles of the present invention produced by the methods of the present invention.

The resulting powder consisted of a single $BaFe_{12}O_{19}$ phase, according to x-ray diffraction patterns. FIG. 8 is a plot of the peaks of the X-ray diffraction analysis of this powder. TEM observation showed the powder was composed of substantially spherical particles having a mean particle diameter of 0.9 μm. The particles' coercivity ($H_c$) was 2,750 Oe, and the specific saturation magnetization was ($\sigma_s$) 49.4 emu/g. The magnetic properties of hand-coated tape made using magnetic paint milled for 4 hours were measured as follows: coercivity 2,617 Oe, squareness ratio (SQ) 0.71, switching field distribution (SFD) 0.30, orientation ratio (OR) 1.64, and value of positive ΔM 0. 16.

EXAMPLE 2

Spherical barium ferrite powder was prepared in the same process as in Example 1 except that spherical $Fe_3O_4$ having a particle size of 0.2 μm was used as the spherical iron-based oxide (or hydroxide) starting particles.

Figure 9:
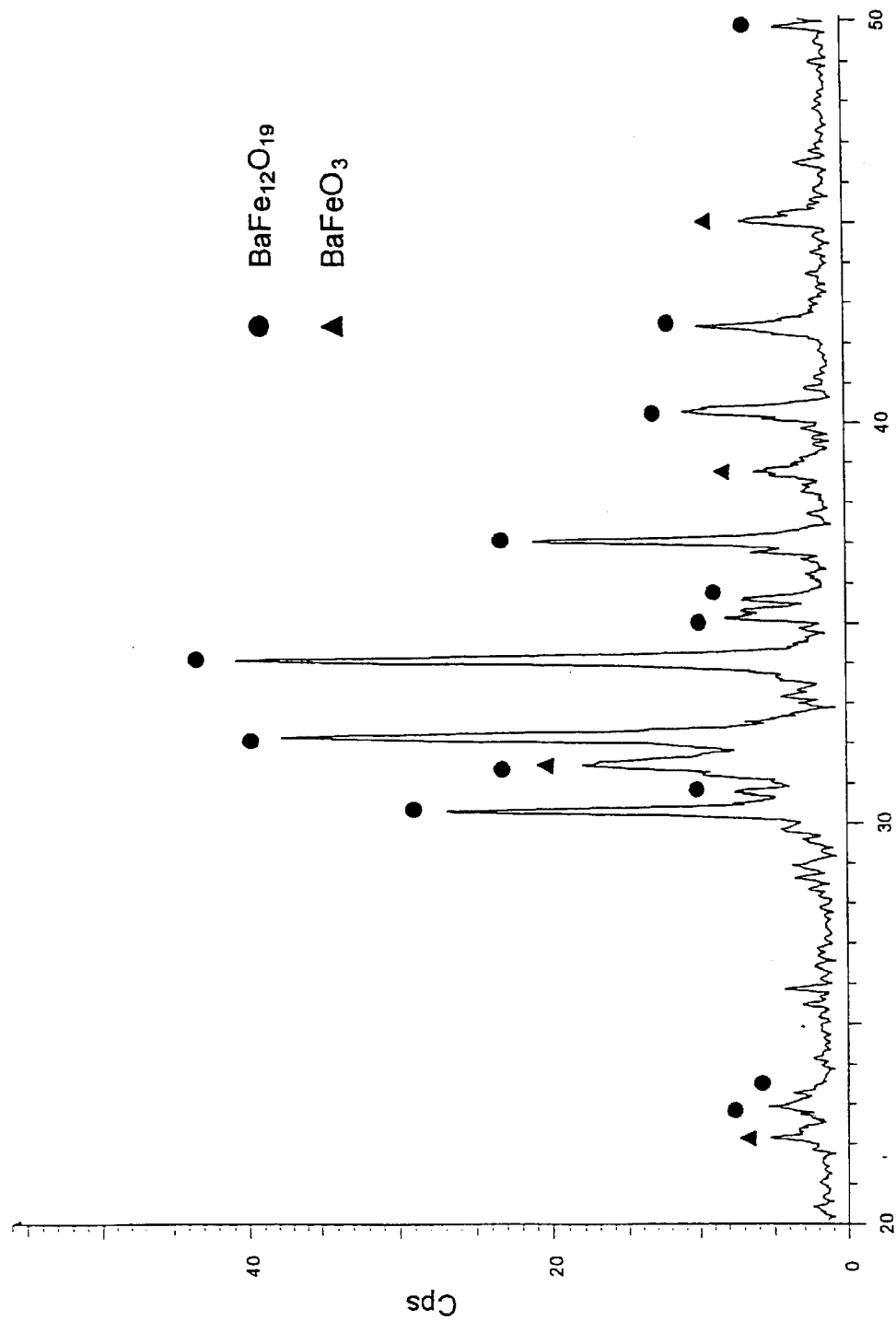

The resulting powder consisted of major $BaFe_{12}O_{19}$ and minor $BaFeO_3$ phases according to the x-ray diffraction patterns. A graph of the X-ray diffraction peaks for this powder is shown in FIG. 9. The TEM micrograph in FIG. 2 shows the resulting substantially spherical 0.2 μm-size barium ferrite particles. The coercivity ($H_c$) of the produced spherical powder was 1,474 Oe, and the specific saturation magnetization ($\sigma_s$) was 40 emu/g.

The magnetic properties of hand-coated tape, made using magnetic paint milled for 4 hours, were as follows: coercivity 1,583 Oe, squareness ratio (SQ) 0.67, switching field distribution (SFD) 0.37, orientation ratio (OR) 1.40, and value of positive ΔM 0.10. This small value of positive ΔM, shown in FIG. 2, indicates the weaker strength of magnetic interactions between particles in the spherical barium ferrite tape than the platelet barium ferrite tape.

EXAMPLE 3

A 80 g dispersion containing 12.5 wt. % of well-dispersed 0.8 μm spherical $Fe_3O_4$ particles was prepared directly by aging an Fe— and Ti— ion-containing solution at 96° C. for 4 hours and washing. Both a solution of 2.78 g of $BaCl_2 \cdot 2H_2O$ in 20 ml of water and a solution of 1.37 g of NaOH and 1.81 g of $Na_2CO_3$ in 30 ml of water were added into the vigorously stirred slurry of the above dispersion with continuous vigorous stirring. The slurry thus obtained was kept at room temperature for 20 minutes, while stirring. The solid phase of the dispersion was then filtered off using a Buchner-type funnel with vacuum pump, and dried in a fume hood for 12 hours. The resulting dry material was then comminuted by dry-milling by mortar and pestle. The thus comminuted powder was then calcined at 800° C. for 2 hours. The calcined powder was wet-milled using an Eiger mill. After wet-milling, the powder was washed with water to remove sodium and chloride ions, and dried at 130° C. for 6 hours.

The resulting powder consisted of a single $BaFe_{12}O_{19}$ phase, according to x-ray diffraction patterns, and was composed of spherical particles having a particle size of 0.8 µm. This single phase barium ferrite powder had a coercivity ($H_c$) of 4,335 Oe and specific saturation magnetization ($\sigma_s$) 49 of emu/g.

EXAMPLE 4

Spherical strontium ferrite powder was obtained by the same process as described in Example 3 except a solution of 3.04 g of $SrCl_2 \cdot 6H_2O$ was used instead of $BaCl_2 \cdot 2H_2O$. The resulting powder consisted of a single $SrFe_{12}O_{19}$ phase, according to x-ray diffraction patterns, and was composed of spherical particles having a particle size of 0.8 µm. Coercivity ($H_c$) was 5,016 Oe, and specific saturation magnetization ($\sigma_s$) was 45.2 emu/g.

EXAMPLE 5

A dispersion was prepared using an Eiger mill. The dispersion was formed by combining 16.66 g of 0.4 µm-sized spherical α-$Fe_2O_3$ and 100 ml of an aqueous solution comprising 5.38 g of $BaCl_2 \cdot 2H_2O$, 0.98 g of $ZnCl_2$, and 1.32 g of $TiCl_4$. A solution of 2.74 g of NaOH and 3.62 g of $Na_2CO_3$ in 50 ml of water was then added into the above vigorously stirred dispersion. The resulting slurry was kept at room temperature for 20 minutes, while stirring. After stirring, the solid phase of the dispersion was filtered off using a Buchner-type funnel with a vacuum pump, and was dried in a fume hood for 12 hours. The resulting dried material was dry-milled with a pestle. The thus comminuted powder was calcined at 800° C. for 1 hour. The calcined powder was wet-milled using an Eiger mill, washed with reverse-osmosis (RO) water to remove sodium and chloride ions, and dried at 130° C. for 6 hours.

The resulting powder consisted of major $BaFe_{12}O_{19}$ and minor $BaFeO_3$ phases, according to x-ray diffraction patterns. The thus obtained spherical barium ferrite particles had a mean particle size of 0.4 µm, coercivity of 1,720 Oe, and specific saturation magnetization of 41.2 emu/g. The particles thus obtained are shown in the micrograph of FIG. 1.

EXAMPLE 6

A dispersion was prepared using an Eiger mill. The dispersion was formed by combining 10 g of 0.1 µm-size substantially spherical $Fe_3O_4$, including Ti (Ti/Fe=9 mol %) ions, and 80 ml of an aqueous solution comprising 2.78 g of $BaCl_2 \cdot 2H_2O$ and 0.49 g of $ZnCl_2$. A solution of 1.37 g of NaOH and 1.81 g of $Na_2CO_3$ in 30 ml of water was then added to the above vigorously stirred dispersion. The slurry obtained was kept at room temperature for 20 minutes, while stirring. The solid phase of the dispersion was then filtered off using a Buchner-type funnel with vacuum pump, and was dried in a hood for 12 hours. The resulting dry material was dry-milled by mortar and pestle. The comminuted powder was then calcined at 780° C. for 2 hours. The calcined powder was wet-milled using an Eiger mill, washed with reverse-osmosis (RO) water to remove sodium and chloride ions, and dried at 130° C. for 6 hours. The resulting powder consisted of major $BaFe_{12}O_{19}$ and minor $BaFeO_3$ phases, according to x-ray diffraction patterns. The thus-obtained spherical barium ferrite particles had a particle size of 0.1 µm, a coercivity of 1,367 Oe, and a specific saturation magnetization of 38.2 emu/g.

EXAMPLE 7

A dispersion was prepared using an Eiger mill. The dispersion was formed by combining 10 g of 0.1-µm spherical $Fe_3O_4$, including Ti ions (Ti/Fe=9 mol %), and 80 ml of an aqueous solution comprising 4.29 g of $Ba(OH)_2 \cdot 8H_2O$ and 0.62 g of $ZnCl_2$. A solution of 5.00 g of $Na_2CO_3$ in 30 ml of water was then added to the above vigorously stirred dispersion. The slurry thus obtained was stirred at room temperature for 20 minutes. After mixing, the solid phase of the dispersion was filtered off using Buchner-type funnel with vacuum pump, and was dried in a hood for 12 hours. The resulting dried material was dry-milled by mortar and pestle. The resulting comminuted powder was calcined at 790° C. for 1.5 hours. The calcined powder was then wet-milled using an Eiger mill, washed with reverse-osmosis (RO) water to remove sodium and chloride ions, and dried at 130° C. for 6 hours.

The resulting powder consisted of major $BaFe_{12}O_{19}$ and minor $BaFeO_3$ phases according to x-ray diffraction patterns. The thus-obtained spherical barium ferrite particles had a particle size of 0.1 µm, coercivity of 1,315 Oe, and specific saturation magnetization of 40.4 emu/g.

In view of the many possible implementations of the invention, it should be recognized that the specific implementations above are only examples of the invention and should not be taken as a limitation on the scope of the invention. Rather, the scope of the invention is defined by the following claims. We therefore claim as our invention all that comes within the scope and spirit of these claims.

We claim:

1. A magnetic recording media, comprising:
   a substrate selected from a group consisting of a card, a tape, or a disk; and
   a magnetic layer positioned on the substrate, the magnetic layer comprising substantially spherical magneto-plumbite ferrite particles having a coercivity of at least about 1000 Oe, a size in the range of about 0.05 to about 1.2 µm, and an aspect ratio less than about 2:1, wherein the substantially spherical magneto-plumbite ferrite particles have a composition corresponding to $AO \cdot n(Fe_{2-x}M_xO_3)$, wherein A is at least one of barium and strontium, n is a molar $(Fe_{2-x}M_xO_3)/AO$ ratio in the range of about 5 to about 6, M is more than one substitution element selected from the group of Co, Zn, Ni, Al, Ti, Sn, Si, Nb, and Ta, and x is in a range of 0 to about 3.5.

* * * * *